Nov. 4, 1924.
F. A. UHL
1,514,409
DIRECTION INDICATOR
Filed June 15, 1921
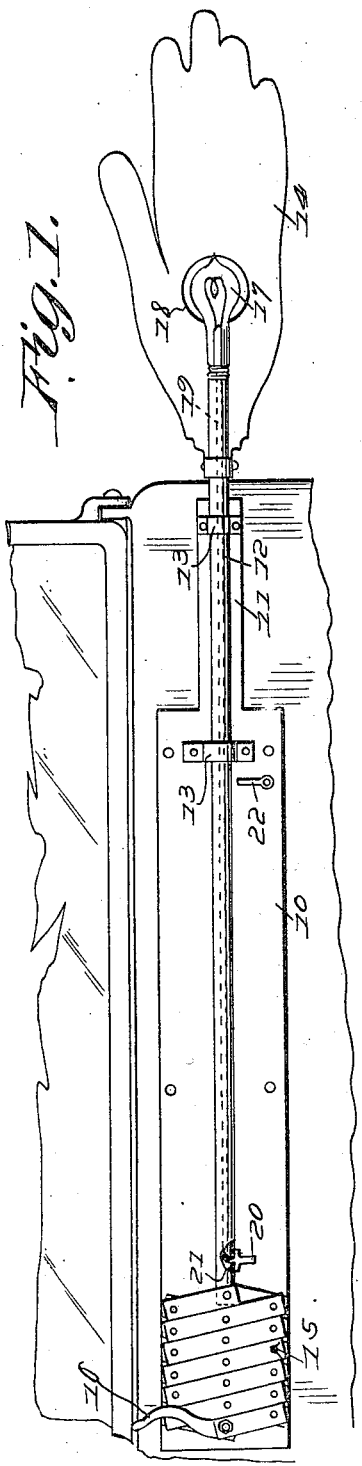
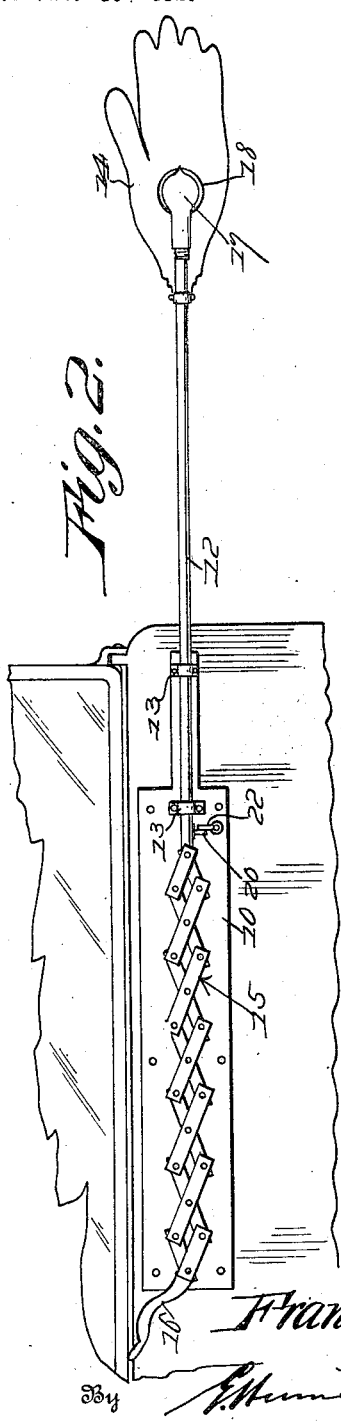
Inventor.
Frank A. Uhl,
By
Attorney Patented Nov. 4, 1924.

1,514,409

UNITED STATES PATENT OFFICE.

FRANK A. UHL, OF INDIANAPOLIS, INDIANA.

DIRECTION INDICATOR.

Application filed June 15, 1921. Serial No. 477,727.

*To all whom it may concern:*

Be it known that FRANK A. UHL, a citizen of the United States of America, residing at Indianapolis, in the county of Marion and State of Indiana, has invented new and useful Improvements in Direction Indicators, of which the following is a specification.

The object of the invention is to provide a simple and efficient direction indicator for use in connection with automobiles and similar vehicles for disclosing to the driver of a following vehicle the intention of the operator of the vehicle equipped with the device with reference to changing direction or progress or stopping; and more especially to provide a device for the purpose indicated which can be readily applied to a vehicle without involving any substantial or any change in the construction thereof; and with this object in view the invention consists in a construction and combination of parts of which a preferred embodiment is shown in the accompanying drawings, wherein:

Figure 1 is a rear view of an apparatus embodying the invention applied in the operative position to a vehicle, the same being shown in its folded or inoperative position.

Figure 2 is a similar view showing the device extended or in its operative position.

The device consists essentially of a base or attaching plate 10 adapted to be secured by means of screws or similar fastening devices to the dash or the front of a vehicle as for example below the wind shield as indicated and which may or may not have a terminal extension 11 according to the structure of the vehicle or the conditions under which the device is to be used, a signal arm 12 consisting of a rod slidingly fitted in suitable guides or keepers 13 on the base or attaching plate and carrying at its outer end a signal such as the representation of a hand 14, and an extension element 15 consisting of lazy tongs of any desired extent to afford the required longitudinal movement of the signal arm, one of the inner links or members of said lazy tongs being provided with a finger hold 16 for actuation by the operator in extending and retracting the signal arm which when folded falls substantially within the length of the attaching plate so as to afford no objectionable projection beyond the side of the vehicle.

It will be understood that a device constructed in accordance with the invention may be arranged at each side for selective extension either to the right or to the left to indicate the intention of the driver to change direction either toward the right or toward the left, and that as a means of indicating an intention to stop or check his forward movement the operator may extend both arms, the finger holds 16 of the two devices being preferably arranged close enough together to permit of the simultaneous operation thereof without inconvenience to the driver of the vehicle.

In order that the device may readily be seen at night it is preferably to employ in connection with the signal such as the hand 14 a lighting unit such as the incandescent light globe 17 arranged in an opening 18 in the signal and supplied by a conductor wire 19 extending through the signal arm which is preferably of tubular form.

At the inner end of the conductor wire there is arranged a contact 20 extending laterally through an opening 21 in the tubular arm and arranged on the base or attaching plate in the path of said terminal or contact arm 20 is a stationary terminal or contact 22 in connection with the ignition system of the vehicle so that when the arm is extended to indicate the intention of the driver to turn in one direction or the other or to stop the engagement of the contacts is effected and the lighting unit is brought into circuit if the lighting circuit of the vehicle is otherwise closed.

Having described the invention, what is claimed as new and useful is:—

A direction indicator for vehicles comprising a base plate adapted for securement to a convenient portion of the vehicle adjacent the dash-board, a signal element, a signal arm consisting of a rod at one extremity of which the signal element is carried, spaced guides mounted on the base plate adjacent one end and slidably receiving said signal arm, lazy tongs having pivotal connection at one end with the base plate remote from said guides and a similar connection at the other end with that extremity of the signal arm remote from the signal element, and a finger hold connected with the lazy tongs at the pivotal point of the latter with the base plate for swinging movement on said pivot point to extend and retract the lazy tongs in the manner and for the purpose specified.

In testimony whereof he affixes his signature.

FRANK A. UHL.